(12) United States Patent
Ballantyne et al.

(10) Patent No.: US 10,375,670 B2
(45) Date of Patent: Aug. 6, 2019

(54) SYSTEM AND METHOD FOR MANAGING THE MONITORING AND RECEIPT OF A PAGING SIGNAL

(71) Applicant: MOTOROLA MOBILITY LLC, Chicago, IL (US)

(72) Inventors: Wayne Ballantyne, Coconut Creek, FL (US); John C Johnson, Spring Grove, IL (US); Phillips W Lohr, Deerfield, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/084,552

(22) Filed: Mar. 30, 2016

(65) Prior Publication Data
US 2017/0289955 A1 Oct. 5, 2017

(51) Int. Cl.
*H04W 4/00* (2018.01)
*H04W 68/00* (2009.01)
*H04W 76/27* (2018.01)

(52) U.S. Cl.
CPC ......... *H04W 68/005* (2013.01); *H04W 76/27* (2018.02)

(58) Field of Classification Search
CPC .................................................. H04W 68/00
See application file for complete search history.

(56) References Cited

U.S. PATENT DOCUMENTS

| | | | |
|---|---|---|---|
| 6,128,487 A * | 10/2000 | Wiedeman | H04B 7/18556 455/12.1 |
| 6,553,228 B1 | 4/2003 | Kotzin | |
| 7,024,196 B1 | 4/2006 | Kotzin | |
| 7,716,723 B1 | 5/2010 | Taylor | |
| 8,260,999 B2 | 9/2012 | Ganesh et al. | |
| 8,325,995 B1 | 12/2012 | Bowers et al. | |
| 8,594,738 B2 | 11/2013 | Cook et al. | |
| 2007/0259699 A1 * | 11/2007 | Homchaudhuri | H04W 52/0216 455/574 |
| 2007/0264955 A1 | 11/2007 | Tsai | |

(Continued)

OTHER PUBLICATIONS

ETSI TS 136 300 v10.8/0 (Jul. 2012), LTE; Evolved Universal Terrestrial Radio Access (E-UTRA) and Evolved Universal Terrestrial Radio Access Network (E-UTRAN); Overall description; Stage 2 (3GPP TS 36.300 version 10.8.0 Release 10), all pages.

(Continued)

*Primary Examiner* — Shantell L Heiber
(74) *Attorney, Agent, or Firm* — Loppnow & Chapa (57) ABSTRACT

The present invention provides a system and method for managing in a wireless communication device the receipt of a paging signal from a wide area wireless network. The method includes detecting by the wireless communication device whether the user of the wireless communication device is available for receiving an alert regarding incoming information via the wireless communication device. When the device determines that the user is not available for receiving the alert, one or more intervals during which a paging signal is expected as being possible are ignored by the wireless communication device, such that any paging signal for the wireless communication device that is present during the one or more intervals that are being ignored by the wireless communication device are not received by the wireless communication device.

20 Claims, 6 Drawing Sheets

(56) References Cited

U.S. PATENT DOCUMENTS

| | | |
|---|---|---|
| 2008/0003943 A1 | 1/2008 | Maheshwari |
| 2008/0293419 A1 | 11/2008 | Somasundaram |
| 2009/0034443 A1* | 2/2009 | Walker .............. H04W 52/0274 370/311 |
| 2009/0129291 A1 | 5/2009 | Gupta |
| 2009/0270111 A1 | 10/2009 | Nakamura |
| 2010/0007496 A1 | 1/2010 | Orlassino |
| 2010/0157866 A1 | 6/2010 | Sarikaya |
| 2010/0159960 A1 | 6/2010 | Chou |
| 2010/0197307 A1 | 8/2010 | Horn |
| 2010/0203905 A1 | 8/2010 | Chaubey |
| 2011/0299454 A1 | 12/2011 | Krishnaswamy |
| 2012/0214502 A1 | 8/2012 | Qiang |
| 2013/0337797 A1 | 12/2013 | Ban |
| 2014/0106790 A1 | 4/2014 | Kakinada |
| 2014/0118520 A1* | 5/2014 | Slaby ................ G06K 9/00926 348/77 |
| 2014/0274122 A1 | 9/2014 | Tseng |
| 2015/0156717 A1 | 6/2015 | Narasimha et al. |
| 2015/0365540 A1* | 12/2015 | Davis ................. H04M 19/042 455/567 |
| 2016/0029303 A1 | 1/2016 | Sahu |

OTHER PUBLICATIONS

3GPP2 C.S0082-0 Version 1.0 (Aug. 2006); Circuit Services Notification Application Specification for cdma2000 High Rate Packet Data, 59 pages.

LTE-TA-Planning Guideline; 11/100 56-HSC 105 50/1 Uen B Nov. 27, 2009, 33 pages.

Wayne Ballantyne, et al., "System and Method for Establishing a Paging Proxy in a Wide Area Wireless Network", U.S. Appl. No. 14/920,279, filed Oct. 22, 2015.

Wayne Ballantyne, et al., "System and Method for Receiving and Relaying a Paging Message Via a Paging Proxy", U.S. Appl. No. 15/595,563, filed May 15, 2017.

\* cited by examiner

SYSTEM AND METHOD FOR MANAGING THE MONITORING AND RECEIPT OF A PAGING SIGNAL

FIELD OF THE INVENTION

The present invention relates generally to a system and method for managing the receipt of a paging signal for a mobile wireless communication device from a wide area wireless network, and more particularly, to a reduction in the monitoring by a wireless communication device of the time intervals during which a paging signal is expected as being possible for the detection of a paging signal for the wireless communication device from the wide area wireless network, based upon an availability of a user of the device to receive incoming information associated with the corresponding paging signal.

BACKGROUND OF THE INVENTION

One of the factors that make cellular communications via a wireless communication device desirable is the ability make a communication connection with less concerns as to your present location, where the same device can generally connect wirelessly to the network infrastructure with less restrictions as to location while within the boundaries of a coverage area that can include multiple base station transmission sites. This allows one an ability to be mobile and still retain the capabilities of making and maintaining a communication connection via the network infrastructure.

Portable wireless communication capabilities are not only supported by a wireless transmit and receive architecture that involves the ability to transmit and receive a communication signal over distance without a wired connection, but also typically involves some form of power local to the device that can be used to support the operation of electronic circuits used by the device for support of its various functions. More specifically, mobile stations are often conventionally powered by a depletable energy source, such as a battery. In many instances, an at least partially or substantially fully depleted battery can then be recharged to further extend the ability of the battery to provide power to the various electronic circuits of the device. However, in order to be recharged, the device often needs to find an outlet of a main supply for making a wired connection, wherein during the recharging, the mobility of the device can be significantly restricted.

Correspondingly, device users will often get into the habit of recharging their devices during the night when they are sleeping, and they are generally not very mobile, so that in the morning the device will have a full charge at the start of the day. It is further desirable for the charge to last as long as possible thereafter, where ideally the charge will last at least until they are ready to go asleep again the following night in order to minimize the need to recharge their device during the day, when they are generally more active. One potential solution might be to add a sufficiently large battery to support the functioning of the device over the desired period of time. However, there is an equally desired trend to minimize the overall size and weight of the device, where a larger battery will often contribute to an increase in the overall size and weight of the device. Still further, as more features are incorporated into the device, an increased number of power drawing components, such as circuits, are often necessary to support the increase in functionality.

As such, there is a balance between decreasing the amount of power necessary to support an existing function with the increased power requirements associated with adding new, enhanced, or additional functionality, as well as a balance with the size of the battery and the ability of the battery to store and subsequently supply power. One such technique that has been used to try and reduce overall power consumption involves the use of a periodic paging signal constrained to a specific, reduced portion of the overall control channel, which can be used to alert the mobile device of an incoming call or communication. When waiting for an alert of an incoming call, the receiver of the mobile device can be activated for these portions, and, unless otherwise actively communicating with the network infrastructure, can be deactivated during the other portions of the channel in which no signal of interest is expected. However even during these reduced portions of the overall control channels, incoming pages for a particular mobile device can be rare. Correspondingly, the mobile device is often waking up to receive a paging signal during many instances, where there is no incoming page to be received.

From a network perspective, restricting paging messages to a particular portion of the control channel already has the possibility of adding some latency to the actual delivery of the paging message. Furthermore, because the page does not utilize a guaranteed delivery method, it may be necessary to repeat the message one or more times. Still further, because the network may not know with reasonable certainty where a mobile device is located, the page is sent to a tracking area for broadcast that can include 100 or more eNB's or base station type nodes, which represents potentially significant network resources.

However, there are instances in which even when a paging signal is present, that the device and/or the user of the device, is not readily available to benefit from more immediately receiving an incoming communication. In such instances, receiving an incoming communication, sooner, has less present value, because the user in unavailable to receive the current communication at this time. As such, there is less benefit to insuring that an incoming message is received, as soon as it is available.

Correspondingly, the present inventors have recognized that it would be beneficial to reduce even further the monitoring for a paging signal, and thus save even more power by allowing the receiver to remain deactivated for even longer periods of time in instances where the user has been identified as not being available to immediately benefit from receipt of an incoming communication. A set of one or more sensors can monitor the availability of the user relative to the wireless communication device, as well as the corresponding current context of device use, to determine if reducing the monitoring of the paging channel would be beneficial. Most incoming communications are maintained on a server in the communication network until they are received by the device. As such, there may be no urgency to receive the communication, as well as any indication that an incoming communication is awaiting delivery until the user is available to benefit from receiving the incoming communication. In turn, the mobile device could save power by reducing the monitoring of a paging signal in instances, where any resulting increase in latency regarding the notification receipt of an incoming message is of less concern.

SUMMARY OF THE INVENTION

The present invention provides a method for managing in a wireless communication device the receipt of a paging signal from a wide area wireless network. The method includes detecting by the wireless communication device whether the user of the wireless communication device is available for receiving an alert regarding incoming information via the wireless communication device. When the device determines that the user is not available for receiving the alert, one or more intervals during which a paging signal is expected as being possible are ignored by the wireless communication device, such that any paging signal for the wireless communication device that is present during the one or more intervals that are being ignored by the wireless communication device are not received by the wireless communication device.

In at least one embodiment, ignoring one or more intervals during which a paging signal is expected as being possible includes deactivating or maintaining in a deactivated state the receiver, which is adapted to receive a paging signal when present, during the one or more intervals which are to be ignored.

In at least a further embodiment, after the wireless communication device has determined that the user is not available for receiving an alert, and wherein one or more intervals during which a paging signal is expected as being possible has been ignored, upon detecting that the user is now available to receive an alert, the wireless communication device resumes monitoring for paging signals during at least some of the otherwise ignored intervals during which a paging signal is expected as being possible.

The present invention further provides a wireless communication device. The wireless communication device includes a wireless receiver for receiving information from a wide area network including a paging signal used to alert the wireless communication device of an incoming communication. The wireless communication device further includes one or more sensors adapted for detecting whether the user of the wireless communication device is available for receiving an alert regarding incoming information for the wireless communication device. The wireless communication device still further includes a paging controller adapted for ignoring one or more intervals during which a paging signal is expected as being possible, such that any paging signal for the wireless communication device that is present during the one or more intervals that are being ignored by the wireless communication device are not received by the wireless communication device, when the wireless communication device determines that the user is not available for receiving the alert.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
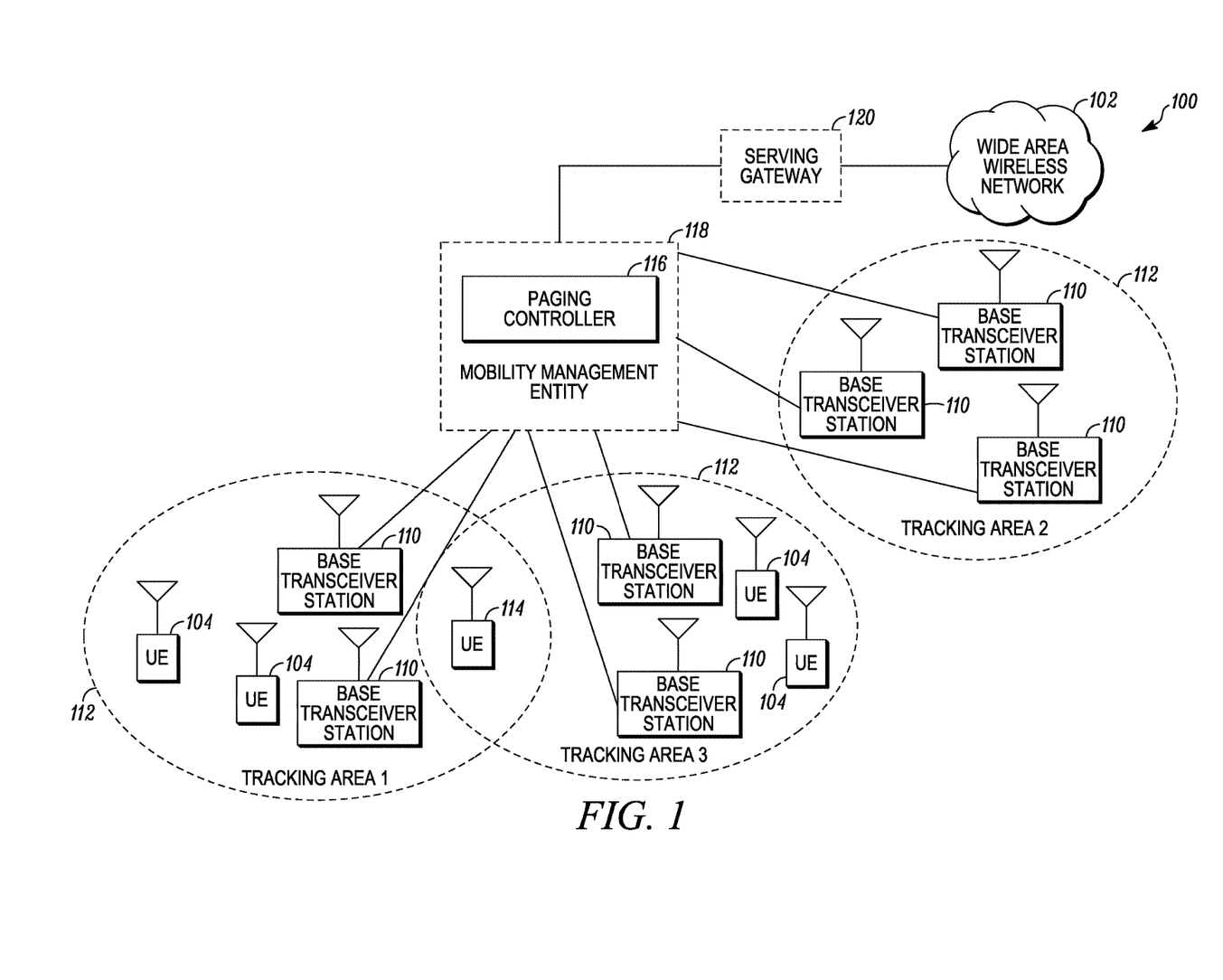
FIG. 1 is a block diagram of an exemplary network environment in which the present invention is adapted to operate.

FIG. 1 illustrates a block diagram of an exemplary network environment 100 including a wide area wireless network in which a network infrastructure enables one or more wireless communication devices 104, often referred to as user equipment (UE), to operate through wireless communications with the network and with each other. In the illustrated embodiment, the wide area wireless network is a wireless cellular network, which includes geographically dispersed base transceiver stations 110, each base transceiver station generally corresponding to one or more cellular regions, which can then be grouped into various tracking areas 112. Each tracking area 112 corresponds to the particular group of base transceiver stations 112 and/or cellular regions that will be used to relay a paging signal when a particular wireless communication device needs to be alerted as to an incoming call or message. In other words, when a wireless communication device 104 is in an idle state, i.e. not actively communicating with the network infrastructure 102 of the wide area wireless network 102, the network maintains the current location of the mobile wireless communication device 104 at a tracking area level of granularity, as opposed to a cell level of granularity. While in an idle state, the wireless communication device 104 will periodically wake up to monitor a control channel to determine if there is a paging message for the device 104, which would alert the device 104 as to a need to establish a more dedicated communication connection between the wireless communication device 104 and the wide area wireless network 102.

In some instances, a wireless communication device 114 can be in an area of overlap and/or proximate a boundary relative to multiple tracking areas 112. In such an instance, a wide area wireless network 102 may associate multiple tracking areas 112 with a particular wireless communication device 114. While the grouping of base transceiver stations 110 for paging purposes in some networks are referred to as tracking areas, in other instances it is possible for the tracking area to alternatively be referred to as location areas, routing areas, or registration areas.

The paging of wireless communication devices 104, is generally managed by a paging controller 116, which in the illustrated embodiment is incorporated as part of a mobility management entity 118. The paging controller 116 initiates the paging procedure by sending a paging message to the base transceiver stations 110, which are part of the tracking area(s) associated with the target wireless communication device 104. The base transceiver stations 110 then broadcasts the paging message to the corresponding cellular transmission areas of the base transceiver stations that are part of the associated tracking area(s). In at least some instances, the mobility management entity 118 will communicate with the rest of the wide area wireless network 102 via a serving gateway 120.

The actual paging message will generally be broadcast in a predetermined paging channel during a predetermined subset of the available time intervals available for paging, during which it is expected that the particular wireless communication device 104 that is the intended recipient of the paging message will be monitoring the paging channel. There are often provisions for the paging controller 116 to retransmit a paging message, as well as potentially expand the area within which the paging message is broadcast, in absence of an indication that the earlier transmission has been received by its intended recipient. If after a predefined number of paging attempts, where the wireless communication device 104 fails to respond, further attempts to page the wireless communication device 104 may be suspended by the paging controller 116 until a later time.

Failure to receive a paging message may preclude a wireless communication device 104 from establishing a more regular communication connection with the wide area wireless network 102. As such, an indication of an incoming communication such as an email, a text message, and/or a voice communication may be missed or delayed, and the missed message, if any, will often times be stored on a server until it can be later received. Furthermore, the device may not have an indication that such a communication was missed. However, until the user is present and available to receive such a communication and/or indication, the fact that the communication is missed is often irrelevant, as the message would not have immediately reached its ultimate destination, while the user was unavailable to receive it. Consequently, more active efforts to monitor a paging channel during instances in which the user is unavailable to benefit from the associated messaging would be somewhat wasted. Furthermore, the increased delay in receiving a paging message while a user is unavailable, is likely less of a concern. As such, by reducing the instances in which a paging channel is monitored by the wireless communication device 104, when the user of the device is not available for receiving the alert, increased portions of the device can become or remain inactive, and/or enter or remain in a lower power state, thereby reducing the overall rate of power consumption in the device.

Figure 2:
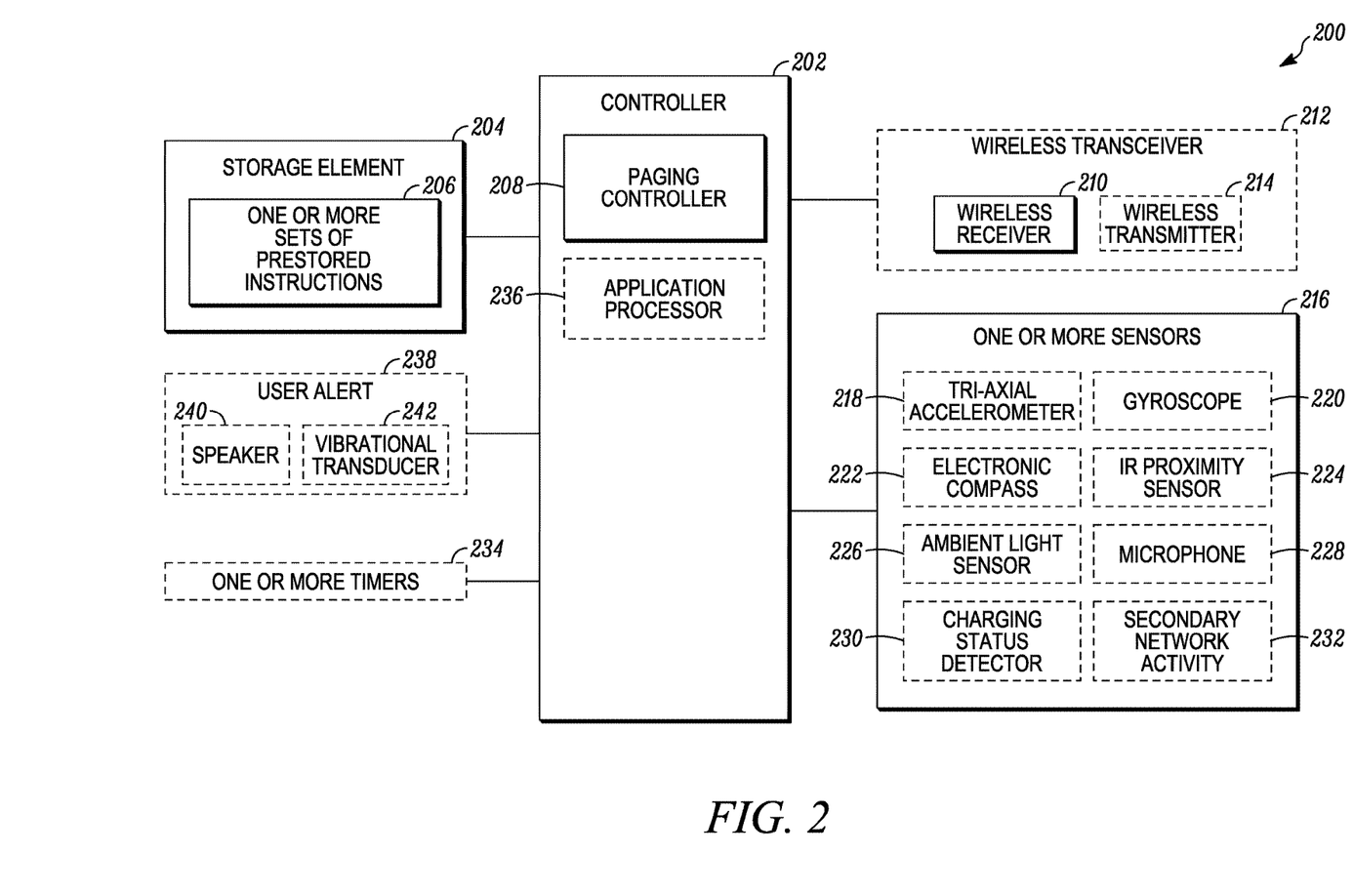
FIG. 2 is a block diagram of a wireless communication device for use in a wide area wireless network, illustrated in FIG. 1.

FIG. 2 illustrates a block diagram 200 of a wireless communication device 104 for use in a wide area wireless network 102, illustrated in FIG. 1. Examples of a wireless communication device 104 can include a radio frequency telephone, a tablet, a personal computer, a cellular telephone, a cordless telephone, a smartphone, a selective call receiver, an audio player, a gaming device, a set top box and a personal digital assistant. However, one skilled in the art will appreciate that the present invention could also be used with many other types of devices, without departing from the teachings of the present invention, as increasingly more and more devices are being equipped with wireless communication capabilities for which the present application may be suitable including instances where it is desirable for the device to communicate within a wide area wireless network, where it may be helpful to better manage the receipt of an alert of an incoming communication for the wireless communication device.

The wireless communication device 104 includes a controller 202 or processor, which is adapted for managing at least some of the modem-related operation of the device, and a storage element 204, which could be used for storing one or more sets of pre-stored instructions 206 for use by the controller 202 as well as other information that might be used in managing at least some of the operation of the device. In some embodiments, the controller 202 could be implemented in the form of one or more microprocessors, which are adapted to execute the one or more sets of pre-stored instructions 206, which may be used to form or implement the operation of at least part of one or more controller modules. The one or more sets of pre-stored instructions 206, which while shown as being stored in a separate storage element 204 could also be integrated as part of the controller 202, which may additionally or alternatively include some data storage capability for storing at least some of the prestored instructions for use with the controller 202.

The storage element 204 could include one or more forms of volatile and/or non-volatile memory, including conventional ROM, FLASH, EPROM, RAM, or EEPROM. The data storage capabilities may also include one or more forms of auxiliary storage, which is either fixed or removable, such as a hard drive, a floppy drive, or a memory stick. One skilled in the art will still further appreciate that still other further forms of storage elements could be used without departing from the teachings of the present disclosure. In the same or other instances, the controller 202 may additionally or alternatively incorporate state machines and/or logic circuitry, which can be used to implement at least partially, some of the modules and/or functionality associated with the controller 202.

The controller 202 includes a paging controller 208, which is adapted to selectively activate and deactivate a wireless receiver 210. More specifically, the paging controller 208 is adapted to selectively activate and deactivate a wireless receiver 210, based upon a predetermined paging interval, as well as a determination by the wireless communication device 104 as to whether the user of the device 104 is available for receiving an alert from the device 104 regarding incoming information that might be associated with a page, if and when received. The wireless receiver 210 can be part of a wireless transceiver 212 that can additionally include a wireless transmitter 214.

A determination as to whether a user of the device 104 is available for receiving an alert regarding incoming information associated with a page can be facilitated with the help of a sensor suite associated with the wireless communication device 104, that can include one or more sensors 216. The one or more sensors 216 can be used to detect the current position and usage context relative to the device including in at least some instances the user's current relationship relative to the device 104. For example, contextual information that might speak to the position of the user relative to the device, and/or whether the user may be able to pay attention to the device, may be possible. A user that is away from the device may not be able to readily perceive an incoming alert, and/or their ability to respond to an alert may be somewhat delayed. It is also possible that a user could be located nearby the device and still be unable to readily perceive an incoming alert. For example, the user may be unconscious and/or asleep.

By monitoring the one or more sensors 216, the device 104 may be able to identify at least some circumstances in which the user is unavailable for receiving an alert associated with an incoming page, and in which there may be benefits associated with ignoring some or all of the expected intervals in which a paging signal for the wireless communication network from the wide area wireless network is expected as being possible. The one or more sensors 216 can include accelerometers 218, gyroscopes 220, electronic compasses 222, infra-red (IR) proximity sensors 224, ambient light sensors 226, microphones 228, charging status detectors 230 and secondary network activity sensors 232, that might speak to movement, location, and/or a type of user interaction relative to the device 104. For example, secondary network activity sensors 232 can include sensors that detect the presence of devices compatible with the secondary network, as well as their associated activity level, which might allow one to determine a proximity to another device, as well as the manner with which the other nearby devices are being used. More specifically, the secondary network could include Bluetooth, Wi-Fi, as well as near field communication type networks. The one or more sensors 216 could further include a camera, which in conjunction with image processing software could be used to detect one or more conditions relative to the user including whether the user's eyes are closed. The device can further include one or more timers 234, which can be used in conjunction with one or more of the conditions being detected by the one or more sensors 216 to help interpret and identify a more accurate use context.

Still further, the one or more timers 234 can detect the duration of a particular detected context without change, that might be used to make a determination as to the degree to which future paging intervals might be ignored. For example, if a first timer expires indicating that the user is unavailable for receiving an alert regarding incoming information for a duration that exceeds a first predefined value, then the wireless communication device 104 may elect to ignore every other paging interval during which a paging signal is expected as being possible, or correspondingly request a paging cycle that is two times as long. If a second longer duration is exceeded, as detected by the same or a different timer, then the wireless communication device 104 might elect to ignore three quarters of the paging intervals during which a paging signal is expected as being possible, or correspondingly request a paging cycle that is four times as long. If a third still longer duration is exceeded, then the wireless communication device 104 might elect to ignore all of the paging intervals during which a paging signal is expected as being possible, until detected conditions change and it is desirable to again monitor for a paging signal and/or monitor for a paging signal at greater frequency. Ignoring all of the paging intervals during which a paging signal is expected as being possible could include requesting a maximum paging cycle, or could include the wireless communication device 104 detaching from the network 102. In addition to ignoring all or some of the paging intervals during which a paging signal is expected as being possible, certain background data transactions between the wireless communication device 104 and the wireless wide area network 102 could also be selectively suspended or delayed until the user is determined to be no longer unavailable relative to wireless communication device 104.

The number of timers can readily be changed without departing from the teachings of the present invention to accommodate a different number of possible outcomes, in terms of the degree to which the paging intervals are to be ignored. Still further, different timers, as well as different numbers of timers, could be used in connection with each of the monitored conditions from which a conclusion is determined as to whether the user is available for receiving an alert. In other words, multiple sensor outputs, each with their own set of timers, could be used together to determine whether the context or condition being determined has been detected. In at least some instances, context sensing is managed through an autonomous relatively low power subsystem.

In addition to selectively ignoring one or more intervals during which a paging signal is expected, thereby allowing receive circuitry to remain inactive or in a lower power mode of operation during the intervals when the ignoring is occurring, the wireless communication device 104 could also allow other aspects of device to be placed in a lower power state including one or more application processors 236, as well as circuitry used to control and manage a display. One skilled in the art will recognize that other circuit elements could also involve a relatively lower power operating mode that might be selectively activated in connection with a determination as to whether the user of the device is more or less actively interacting with the device 104, as determined via the contextual information from the one or more sensors.

In at least some embodiments, the wireless communication device 104 includes a user alert 238. In these and other instances, the user alert 238 might take the form of a speaker 240, which is adapted to produce an audible alert, or a vibrational transducer 242, which is adapted to produce a vibration that can be felt. In some instances, the same transducer that produces an audible alert can also produce a vibrational effect.

Figure 3:
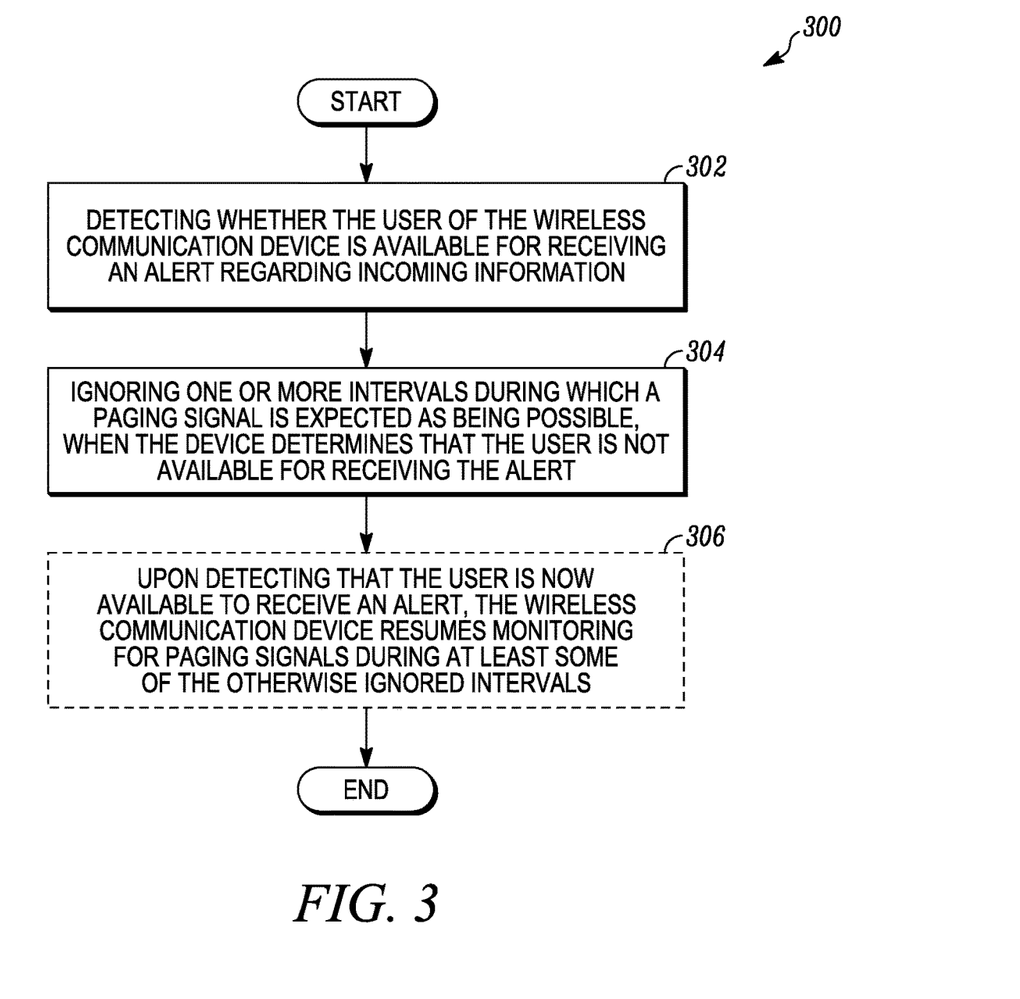
FIG. 3 is a flow diagram of a method for managing in a wireless communication device the receipt of a paging signal from a wide area wireless network.

FIG. 3 illustrates a flow diagram 300 of a method for managing in a wireless communication device the receipt of a paging signal from a wide area wireless network. The method includes detecting 302 whether the user of the wireless communication device 104 is available for receiving an alert via the wireless communication device regarding incoming information. The method further includes wherein, when the device determines that the user is not available for receiving the alert, one or more intervals during which a paging signal is expected as being possible are ignored 304 by the wireless communication device 104. By ignoring the additional one or more intervals during which a paging signal for the wireless communication device 104 is expected as being possible, any paging signal that might be present during an ignored interval would not be received. This could also delay any eventual receipt of a paging signal, thereby increasing the response time of the wireless communication device in responding to the paging signal and potentially establishing a more regular communication connection for receiving any further incoming communication. However, because the user has been determined to not be immediately present relative to the wireless communication device in order to benefit from an earlier receipt of the incoming information, the wireless communication device can benefit from extended operation in a potentially lower power operating state when any resulting communication delays would be less impactful to the user.

In at least some instances, upon detecting that the user is now available to receive an alert via the wireless communication device 104, the wireless communication device 104 will resume monitoring 306 for paging signals during at least some of the intervals in which a paging signal is expected as being possible, that would otherwise be ignored, while the user was detected as not being available to receive an alert.

Figure 4:
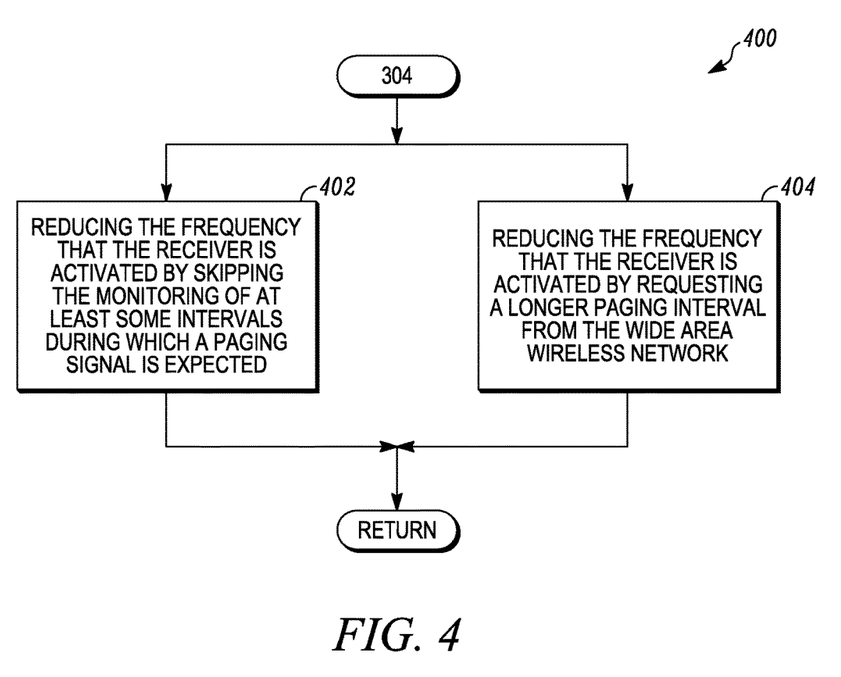
FIG. 4 is a flow diagram of a method of ignoring one or more intervals during which a paging signal is expected as being possible.

FIG. 4 illustrates a flow diagram 400 of a method of ignoring one or more intervals during which a paging signal is expected as being possible. In at least some instances ignoring 304 by the wireless communication device 104 one or more intervals during which a paging signal for the wireless communication device 104 is expected includes reducing the frequency that a receiver 210, which is adapted to receive a paging signal when present, is activated. This in turn enables the portion of the wireless communication device 104, which is adapted to receive a wireless communication signal to remain in a relatively lower power operating state. While such an operation may have a negative effect on the ability of the wireless communication device 104 to more immediately receive a wireless communication signal, because it can be managed in such a way so as to occur at a time when the user is less able to benefit from the signal that might be more immediately received, any delay with correspondingly receiving the wireless communication signal is mitigated.

In the illustrated embodiment, the method of ignoring one or more intervals during which a paging signal is expected as being possible can include reducing the frequency that the receiver is activated by skipping 402 the monitoring of at least some intervals during which a paging signal is expected. In other instances, the ignoring of one or more intervals during which a paging signal is expected as being possible can include requesting 404 a longer paging interval from the wide area wireless network.

Figure 5:
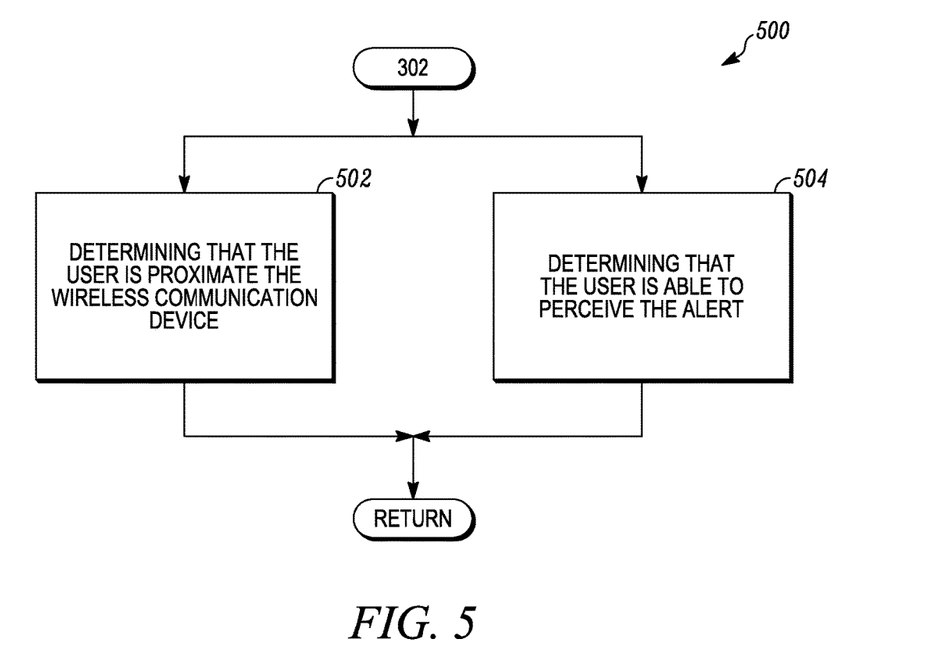
FIG. 5 is a flow diagram of a method of determining that the user of the wireless communication device is available for receiving an alert.

FIG. 5 illustrates a flow diagram 500 of a method of determining that the user of the wireless communication device is available for receiving an alert. In at least some instances a determination 502 can be made as to whether the user is proximate the wireless communication device 104, and if so, the user is deemed more likely to be available for receiving an alert. In the same, or other instances, a determination 504 can be made as to whether the user is able to perceive the alert. For example, even though the user might be near the device 104, the user might be in a state in which perception of an alert would be difficult. In some instances, it might be possible to detect that the user may be asleep or otherwise unconscious. In such an instance, even though the user may be proximate the device 104, the user may be unable to receive or respond to an alert from the device, which is intended to inform the user of an incoming communication.

Figure 6:
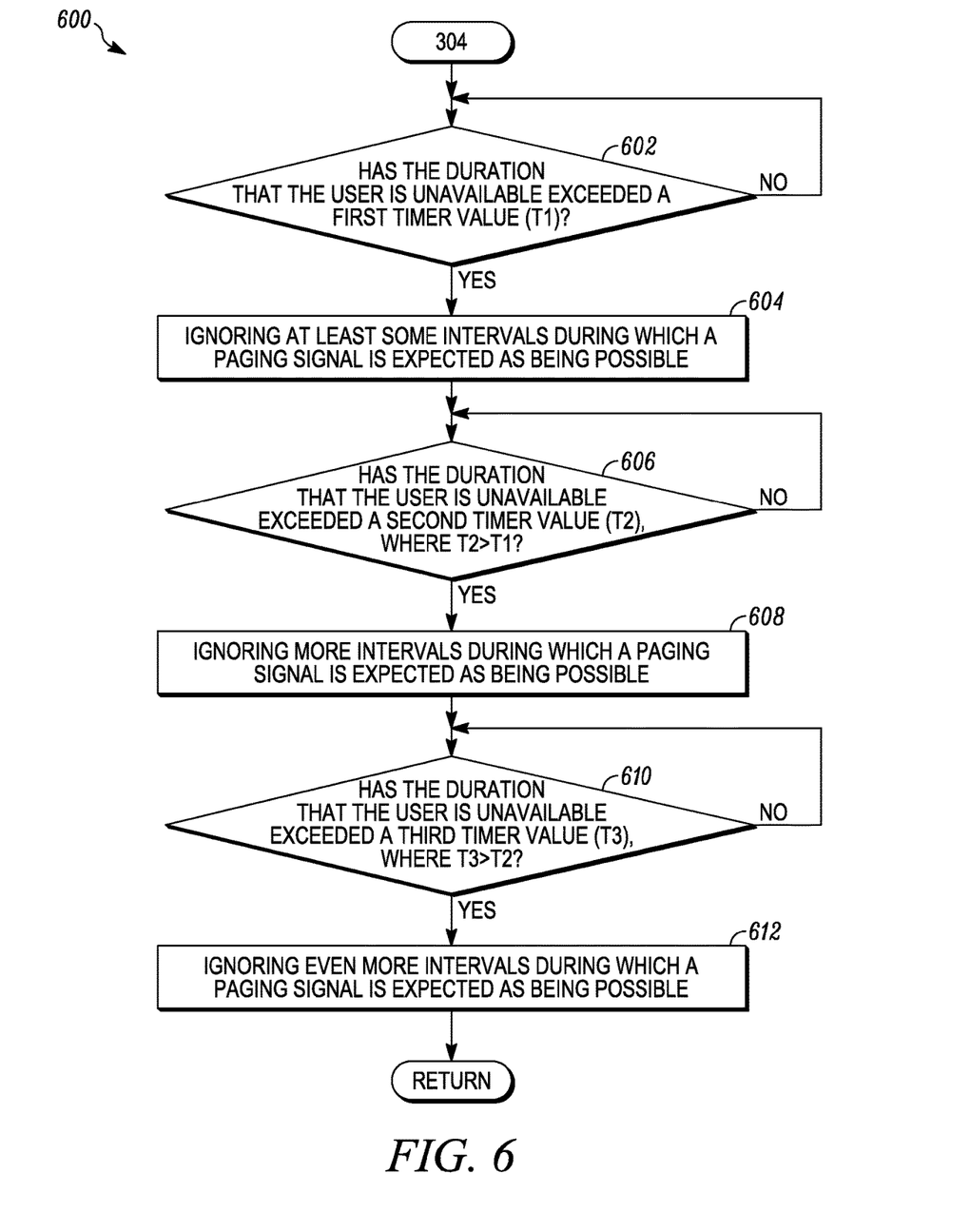
FIG. 6 is a flow diagram of a method of determining a degree to which the intervals during which a paging signal is expected should be ignored, as a function of the duration that the user is detected as being unavailable for receiving an alert.

FIG. 6 illustrates a flow diagram 600 of a method of determining a degree to which the intervals during which a paging signal is expected should be ignored, as a function of the duration that the user is detected as being unavailable for receiving an alert. The method includes a determination as to the duration that the user has been identified as being unavailable, and more specifically, as to whether 602 the duration that the user is unavailable exceeds a first timer value (T1). If not, the flow diagram loops back, and repeats until the value of the first timer has been exceeded. If so, the method provides for an adjustment 604 to the degree with which at least some paging intervals in which a paging signal for the wireless communication device is expected as being possible are ignored. The method then monitors 606 for a second timer value (T2) having been exceeded, relative to the user having been unavailable. The timer associated with the second timer value (T2) can run concurrently with the first timer associated with a first timer value (T1), in which case the value of the second timer value (T2) is intended to have a longer duration than the first timer value (T1). It is also possible that the start of the second timer might be delayed until after the first timer has already exceeded the first timer value (T1), in which case the second subsequent timer would measure an incremental increase in the period of time that the user has been detected as being unavailable. In any event, a determination that the user is unavailable for an even longer predetermined period of time, can result in more of the intervals during which a paging signal is expected as being possible are ignored 608.

The illustrated embodiment, still further includes a further determination 610 as to a third timer value (T3), and correspondingly, a still further adjustment 612 of the amount of intervals that a paging signal is expected as being possible are ignored. There is no limit to the number of timers, or in other words the granularity of adjustment relative to the ignoring of one or more intervals during which a paging signal for the wireless communication device is expected as being possible. Still further, the various timers could be separately associated with different outputs of the various sensors used to detect the current context of use of the wireless communication device 104 relative to the user. In any event, the detected duration that a condition of interest is detected can affect the degree to which the device elects to adjust the subsequent operation relative to detection of a paging signal or other manner of operation, that might allow the device to operate in a lower power state, or have at least some portions of the device, such as the detection and receipt of an incoming wireless communication, operate in a lower power state.

As noted previously, the decision to ignore at least some of the intervals during which a paging signal is expected as being possible, can extend to other operational aspects of the device 104, including the operation of one or more application processors, which can also be reduced or delayed. Similarly, various operational and control circuitry, such as the circuitry used to control and manage the operation of the display, could additionally or alternatively be reduced.

By reducing or delaying the operation of various features within the wireless communication device 104, in instances where the user is unlikely to perceive any negative effects associated with the corresponding reduction or delay, the overall rate at which the device consumes power can be reduced, while the effects of such a reduction or delay that might be felt or perceived by the user is minimized.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for managing in a wireless communication device the receipt of a paging signal from a wide area wireless network, the method comprising:
   detecting by the wireless communication device whether a user of the wireless communication device is available for receiving an alert regarding incoming information via the wireless communication device;
   wherein, when the device determines that the user is not available for receiving the alert, one or more intervals during which a paging signal is expected as being possible are ignored by the wireless communication device, such that any paging signal for the wireless communication device that is present during the one or more intervals that are being ignored by the wireless communication device are not received by the wireless communication device.

2. A method in accordance with claim 1, wherein ignoring one or more intervals during which a paging signal is expected as being possible includes deactivating or maintaining in a deactivated state the receiver, which is adapted to receive a paging signal when present, during the one or more intervals which are to be ignored.

3. A method in accordance with claim 2, wherein deactivating or maintaining the receiver in a deactivated state includes detaching the wireless communication device from the wide area wireless network.

4. A method in accordance with claim 1, wherein ignoring one or more intervals during which a paging signal is expected as being possible includes reducing a frequency that a receiver, which is adapted to receive a paging signal when present, is activated.

5. A method in accordance with claim 4, wherein reducing the frequency that the receiver is activated includes skipping the monitoring of at least some of the one or more intervals during which a paging signal is expected.

6. A method in accordance with claim 4, wherein reducing the frequency that the receiver is activated includes requesting from a paging server of the wide area wireless network a longer paging interval.

7. A method in accordance with claim 1, wherein in addition to ignoring one or more intervals during which a paging signal is expected as being possible includes during the intervals in which the paging signal is ignored, the communication of data between the wireless communication device and the wide area wireless network is suspended.

8. A method in accordance with claim 1, wherein in addition to ignoring one or more intervals during which a paging signal is expected as being possible includes reducing the operation of an application processor adapted for executing one or more applications in the wireless communication device.

9. A method in accordance with claim 1, wherein the determination that the user of the wireless communication device is available for receiving the alert includes a determination as to whether the user is proximate the wireless communication device.

10. A method in accordance with claim 1, wherein the determination that the user of the wireless communication device is available for receiving the alert includes a determination as to whether the user is able to perceive the alert.

11. A method in accordance with claim 1, wherein the determination that the user of the wireless communication device is available for receiving the alert includes detecting a context for which the state of the user relative to the wireless communication device can be identified or inferred from a suite of one or more sensors located within the wireless communication device.

12. A method in accordance with claim 1, wherein the incoming information includes information associated with an incoming voice call.

13. A method in accordance with claim 1, wherein the incoming information includes information associated with an incoming text message.

14. A method in accordance with claim 1, wherein after the wireless communication device has determined that the user is not available for receiving an alert, and wherein one or more intervals during which a paging signal is expected as being possible has been ignored, upon detecting that the user is now available to receive an alert, the wireless communication device resumes monitoring for paging signals during at least some of the otherwise ignored intervals during which a paging signal is expected as being possible.

15. A wireless communication device comprising:
a wireless receiver for receiving information from a wide area network including a paging signal used to alert the wireless communication device of an incoming communication;
one or more sensors adapted for detecting whether a user of the wireless communication device is available for receiving an alert regarding incoming information for the wireless communication device; and
a paging controller adapted for ignoring one or more intervals during which a paging signal is expected as being possible, such that any paging signal for the wireless communication device that is present during the one or more intervals that are being ignored by the wireless communication device are not received by the wireless communication device, when the wireless communication device determines that the user is not available for receiving the alert.

16. A wireless communication device in accordance with claim 15, wherein after the wireless communication device via the one or more sensors has determined that the user is not available for receiving an alert, and wherein one or more intervals during which a paging signal is expected as being possible has been ignored, upon detecting by the one or more sensors that the user is now available to receive an alert, the wireless communication device resumes monitoring for paging signals during at least some of the otherwise ignored intervals during which a paging signal is expected as being possible.

17. A wireless communication device in accordance with claim 15 further comprising a wireless transmitter, which is adapted for requesting from a paging server of the wide area network a longer paging interval, for reducing the frequency that the receiver is activated as part of ignoring one or more intervals during which a paging signal is expected as being possible.

18. A wireless communication device in accordance with claim 17, wherein the wireless receiver and wireless transmitter are incorporated as part of a wireless transceiver.

19. A wireless communication device in accordance with claim 15 further comprising an application processor, which can be selectively activated and deactivated with the wireless receiver in conjunction with the determination by the one or more sensors whether the user of the wireless communication device is available for receiving an alert regarding incoming information for the wireless communication device.

20. A wireless communication device in accordance with claim 15 further comprising one or more timers for measuring a duration that the one or more sensors have detected the current state of the user relative to the wireless communication device.

* * * * *